(12) United States Patent
Lee et al.

(10) Patent No.: US 7,409,986 B2
(45) Date of Patent: Aug. 12, 2008

(54) METHOD FOR CONTROLLING FLOW RATE OF VENTILATING AIR IN AIR CONDITIONER

(75) Inventors: Gi Seop Lee, Incheon (KR); Kwan Ho Yum, Seoul (KR); Kyung Hwan Kim, Seoul (KR); Jeong Yong Kim, Seoul (KR); Ho Seon Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 484 days.

(21) Appl. No.: 10/829,224

(22) Filed: Apr. 22, 2004

(65) Prior Publication Data

US 2005/0051321 A1    Mar. 10, 2005

(30) Foreign Application Priority Data

Sep. 8, 2003    (KR) ................ 10-2003-0062624

(51) Int. Cl.
*F28F 13/00* (2006.01)
*F24F 11/00* (2006.01)
(52) U.S. Cl. .............. 165/267; 454/238; 454/239
(58) Field of Classification Search ........... 165/267; 454/238, 239
See application file for complete search history.

(56) References Cited

U.S. PATENT DOCUMENTS 5,538,471 A    7/1996    Guiles, Jr.

FOREIGN PATENT DOCUMENTS

| CN | 1317081 A | 10/2001 |
|---|---|---|
| EP | 1 114 970 A1 | 7/2001 |
| EP | 1 114 970 A1 * | 7/2001 |
| KR | 2003-0063844 A | 7/2003 |

* cited by examiner

*Primary Examiner*—Ljiljana (Lil) V Ciric
(74) *Attorney, Agent, or Firm*—Birch, Stewart, Kolasch & Birch, LLP

(57) ABSTRACT

A method for controlling flow rates of outdoor air supplied to a room and room air discharged to an outside of the room in ventilation. The method of the present invention includes the steps of supplying outdoor air drawn through an air supply duct to a room at a first flow rate, and discharging room air drawn through an air discharge duct to an outside of the room at a second flow rate higher than the first flow rate. The first and second flow rates vary with rotation speeds of fans respectively mounted on an air supply duct and an air discharge duct.

5 Claims, 10 Drawing Sheets

METHOD FOR CONTROLLING FLOW RATE OF VENTILATING AIR IN AIR CONDITIONER

This application claims the benefit of the Korean Application No. P2003-62624 filed on Sep. 8, 2003, which is hereby incorporated by reference.

BACKGROUND OF THE INVENTION

1. Field of the Invention

The present invention relates to air conditioners, and more particularly, to a method for controlling flow rates of outdoor air supplied to a room and room air discharged to an outside of the room for ventilation for an air conditioner having a ventilating function.

2. Background of the Related Art

The air conditioner is an appliance for cooling or heating a room by using a property of refrigerant in which the refrigerant discharges or absorbs heat to/from an environment when the refrigerant undergoes a phase change.

In general, the air conditioner is provided with an indoor unit and an outdoor unit, wherein the air conditioner having the indoor unit and the outdoor unit combined into one unit is called as a unit type air conditioner, and the air conditioner having the indoor unit and the outdoor unit fabricated individually is called as a separate type air conditioner.

As a typical example of the unit type air conditioner, there is a window type air conditioner, and as the separate type air conditioners, there are a ceiling type air conditioner, a wall mounting type air conditioner, and a package type air conditioner. In a case of the ceiling type air conditioner, the indoor unit is installed in the ceiling, in a case of the wall mounting type, the indoor unit is mounted on a wall, and in a case of the package type air conditioner, the indoor unit stands on a floor in the room.

In general, the air conditioner is provided with a compressor, a condenser, an expansion device, and an evaporator. The compressor compresses low temperature/low pressure gas refrigerant to high temperature/high pressure refrigerant, and makes the refrigerant to pass through different units. The condenser condenses the gas refrigerant from the compressor into a liquid refrigerant. In this instance, as the refrigerant discharges heat when the refrigerant is condensed, the condenser discharges heat to an environment. As the heat is discharged from the condenser to the room, the room can be heated.

In general, as the expansion device, expanding the condensed refrigerant by decompression, capillary tubes are used. The evaporator vaporizes the expanded refrigerant, when the refrigerant absorbs heat to cool down air around the evaporator. When such a cooled down air is discharged to the room, the room can be cooled down.

In the meantime, for reducing heat loss during use of the air conditioner, the room is closed. Air in such a closed room is polluted gradually as time passes by. For an example, breathing of persons in the room makes a carbon dioxide content in the room air higher, and there is much dust circulating in the dry air. Therefore, after using the air conditioner for a time period, it is required to supply outdoor air fresh relative to the room air into the room. What is used for this is the very ventilating device.

Most of known related art ventilating devices employ a method in which one fan is used for force discharge of room air to an outside of the room. In this case, it is required to leave the window or door open for introduction of outdoor air into the room. In a case the ventilating system, while the room air is discharged forcibly, the room air is replaced with the outdoor air, naturally. In a ventilating process, there is even a problem in that the outdoor air introduced into the room is discharged to the outside of the room directly through a discharge duct before the outdoor air replaces the room air, adequately. Consequently, for complete ventilation of the room, a long time period is required.

SUMMARY OF THE INVENTION

Accordingly, the present invention is directed to a method for controlling a flow rate of ventilating air in an air conditioner that substantially obviates one or more of the problems due to limitations and disadvantages of the related art.

An object of the present invention is to provide a method for controlling a flow rate of ventilating air in an air conditioner, in which the room can be ventilated, quickly.

Other object of the present invention is to provide a method for controlling a flow rate of ventilating air in an air conditioner, in which heat can be recovered from room air discharged to an outside of a room in a process of ventilation.

Another object of the present invention is to provide a method for controlling a flow rate of ventilating air in an air conditioner, in which the room can be cooled/heated continuously even if the room is ventilated.

Additional features and advantages of the invention will be set forth in the description which follows, and in part will be apparent to those having ordinary skill in the art upon examination of the following or may be learned from practice of the invention. The objectives and other advantages of the invention will be realized and attained by the structure particularly pointed out in the written description and claims hereof as well as the appended drawings.

To achieve these objects and other advantages and in accordance with the purpose of the present invention, as embodied and broadly described herein, the method for controlling a flow rate of ventilating air in an air conditioner, includes the steps of supplying outdoor air drawn through an air supply duct to a room at a first flow rate, and discharging room air drawn through an air discharge duct to an outside of the room at a second flow rate higher than the first flow rate.

The steps of supplying and discharging are carried out at the same time. The first flow rate and the second flow rate vary with time, respectively. The first and second flow rates vary in a cycle, and the first and second flow rates vary many times even in the cycle. Preferably, the first and second flow rates have a fixed difference, always. Meanwhile, the first and second flow rates vary with rotation speeds of fans respectively mounted on the air supply and the air discharge ducts.

In other aspect of the present invention, there is provided a method for controlling a flow rate of ventilating air in an air conditioner, including the steps of an indoor unit drawing and discharging room air, to cool or heat a room, stopping the indoor unit after a preset time period is passed, supplying outdoor air drawn through an air supply duct to the room at a first flow rate in a state the indoor unit is stopped, and discharging room air drawn through an air discharge duct to an outside of the room at a second flow rate higher than the first flow rate in the state the indoor unit is stopped. Or alternatively, the method may be carried out in a state the indoor unit is in operation.

It is to be understood that both the foregoing description and the following detailed description of the present invention are exemplary and explanatory and are intended to provide further explanation of the invention claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiments of the present invention, examples of which are illustrated in the accompanying drawings. In describing the embodiments of the present invention, same parts will be given the same names and reference symbols, and repetitive description of which will be omitted.

Figure 1:
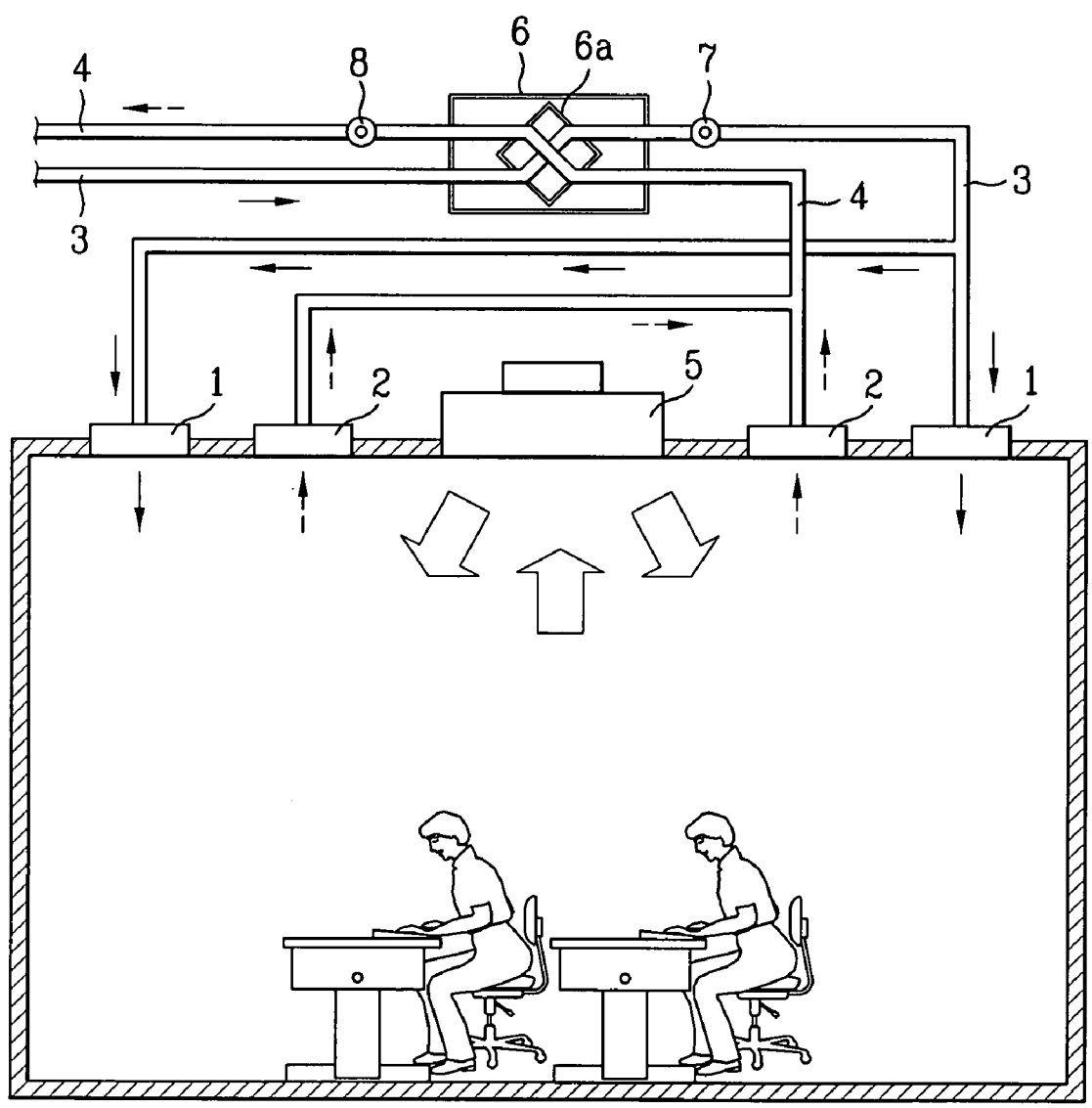
FIG. 1 illustrates a diagram of an air conditioner in accordance with a preferred embodiment of the present invention, schematically.
Figure 2:
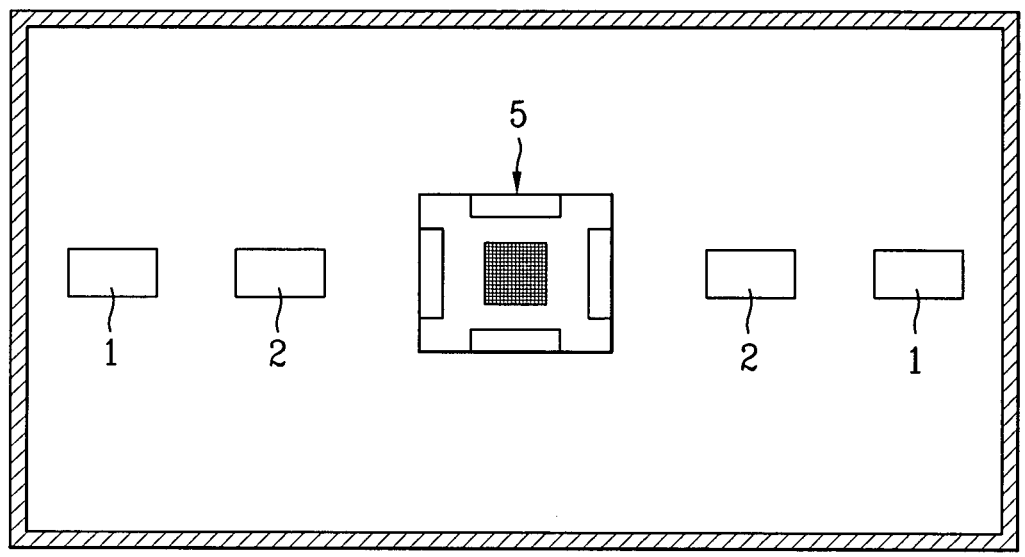
FIG. 2 illustrates a look up view of a ceiling having an air conditioner installed thereon.

The air conditioning system of the present invention provides a ceiling type air conditioner of which indoor unit is installed on a ceiling. The air conditioning system of the present invention can ventilate a room, in which air supplied to the room recovers heat from air discharged to an outside of the room. FIG. 1 illustrates a diagram of an air conditioner in accordance with a preferred embodiment of the present invention, schematically, FIG. 2 illustrates a look up view of a ceiling having an air conditioner installed thereon.

Referring to FIG. 1, there is an indoor unit 5 installed on one point of a ceiling of a room in communication with the room. The indoor unit 5 includes an indoor heat exchanger (not shown), an indoor expansion device (not shown), and an indoor fan (not shown). As shown in FIG. 2, there are a plurality of air discharge ports and air supply ports 1 in the ceiling in the room at points predetermined distances away from the indoor unit 5. An air discharge duct 4 is connected to the air discharge port 2, and an air supply duct 3 is connected to the air supply port 1. One ends of the air supply duct 3 and the air discharge ducts 4 are connected to the outside of the room. In the air conditioning system of the FIG. 1, there are an air supply fan 7 and an air discharge fan 8 mounted on the air supply duct 3 and the air discharge duct 4. There is an outdoor unit (not shown) installed at an outdoor including an outdoor heat exchanger, a compressor, and an outdoor fan, which is identical to a general outdoor unit, of which description will be omitted.

In the meantime, in the air conditioner in accordance with the first preferred embodiment of the present invention, there is a provision for air supplied to the room to recover heat from air discharged to an outside of the room. For this, there is a preheat exchanger 6 in the middle of the air supply duct 3 and the air discharge duct 4 for indirect heat exchange of outdoor air and room air while the outdoor air and the room air flow crossing each other. A structure and operation of the preheat exchanger 6 will be described in more detail with reference to FIGS. 3 and 4. For reference, FIG. 3 illustrates a diagram of heat exchange between outdoor air and room air at a preheat exchanger schematically, and FIG. 4 illustrates a perspective view of heat exchange means in the preheat exchanger in FIG. 3.

Figure 3:
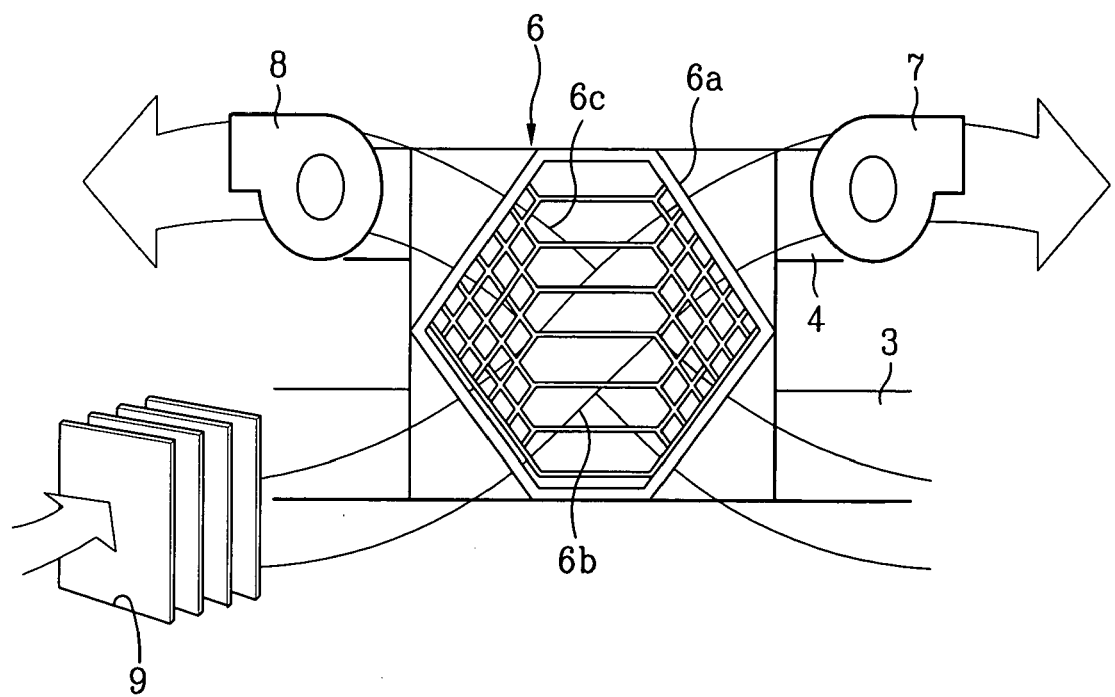
FIG. 3 illustrates a diagram of heat exchange between outdoor air and room air at a preheat exchanger, schematically.

Referring to FIG. 3, the preheat exchanger 6 is provided with heat exchange means 6a, including a plurality of first flow passages 6b for guiding the outdoor air to the room, and a plurality of second flow passages 6c for guiding the room air to the outside of the room. The first flow passage 6b is connected to the air supply duct 3, and the second flow passage 6c is connected to the air discharge duct 4, and the first and second flow passages 6b and 6c are separated with a plurality of plates so as not to be in communication. Since the first flow passage 6b and the second flow passage 6c are formed between the plates, heat transfers through the plate when the outdoor air and the room air pass through the first flow passage 6b and the second flow passage 6c, respectively. According to this, the outdoor air introduced into the room through the first flow passage 6b takes thermal energy from the room air discharged to the outside of the room through the second flow passage 6c. Therefore, the air conditioning system of the present invention can reduce an energy loss in ventilation. In the meantime, an unexplained reference symbol 9 in FIG. 3 denotes a filter, for filtering the outdoor air introduced into the room.

Figure 4:
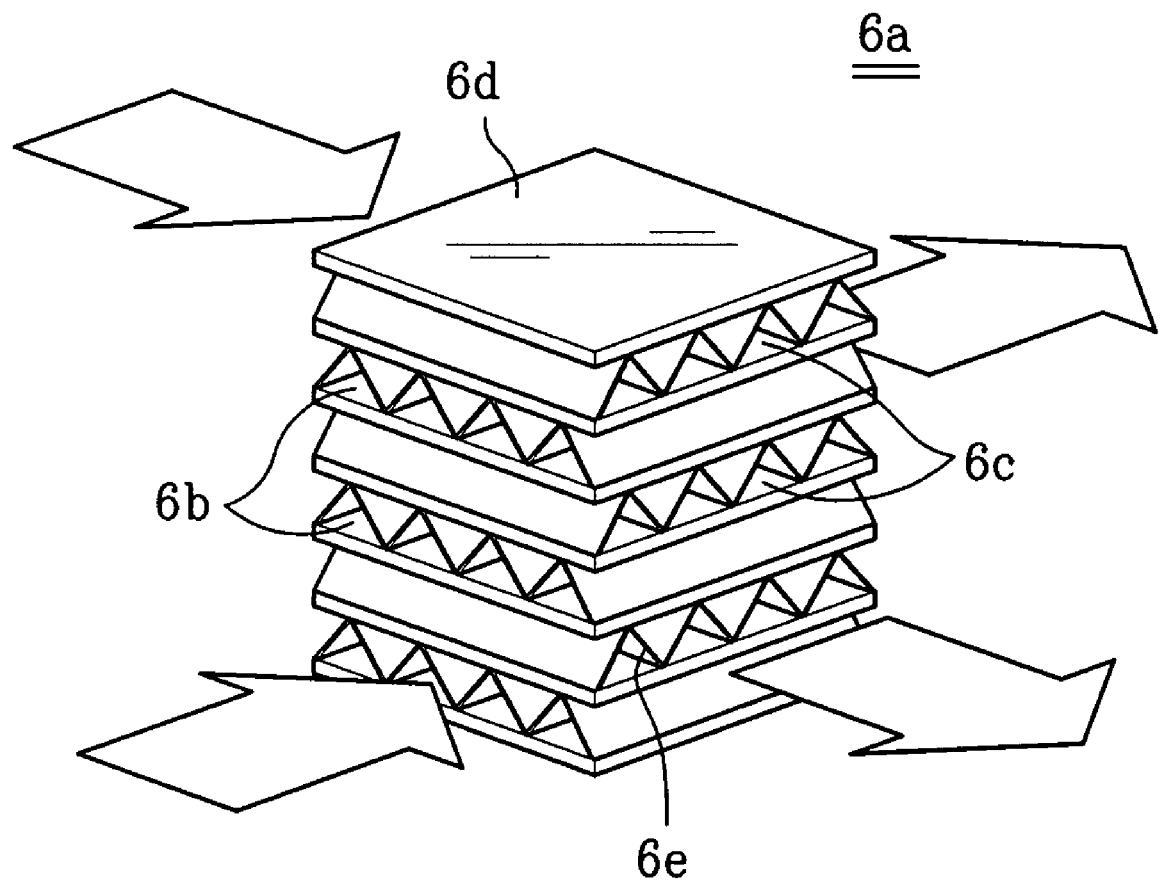
FIG. 4 illustrates a perspective view of heat exchange means in the preheat exchanger in FIG. 3.

FIG. 4 illustrates an embodiment of the heat exchange means 6a. Referring to FIG. 4, the one embodiment of the heat exchange means 6a includes a plurality of plates 6d and a plurality of flow guides 6e. The plates 6d are arranged at regular intervals such that the first flow passage 6b for flow of the outdoor air and the second flow passage 6c for flow of the room air are formed in layers.

The flow guide 6e serves to fix flow directions of the air flow in the first flow passage 6b and the second flow passage 6c, and to make a heat exchanger area larger. The flow guide 6e includes a section having a plurality of continuous folds, of which peaks and bottoms are in contact with a top surface and a bottom surface of each of the plates, respectively. In the meantime, as shown in FIG. 4, the flow guides 6e in the layers may be arranged perpendicular to each other so that the outdoor air and the room air flow perpendicular to each other.

In the meantime, the heat exchange means is not limited to the embodiments described with reference to FIG. 4, but any structure is acceptable as the heat exchange means as far as the structure permits indirect heat exchange of the outdoor air and the room air without mixed to each other.

There can be two kind of methods for indirect heat exchange between the outdoor air and the room air at the preheat exchanger 6. One is heat exchange by means of heat conduction made through the plate 6d and the flow guide 6e that divide the first flow passage 6b and the second flow passage 6c, and the other one is heat exchange by means of condensed water formed on the plate 6d due to a temperature difference between the first guide passage 6b and the second guide passage 6c.

In the operation, referring to FIG. 1, when the outdoor unit and the indoor unit 5 are put into operation, the room air is introduced into the indoor unit 5, heat exchanges with the indoor heat exchanger, and discharged to the room, again. According to this, the room is cooled or heated. After the room is cooled or heated for a time period, ventilation is required, of which process will be described.

In the ventilation, the air discharge fan 8 and the air supply fan 7 are operated. According to this, the outdoor air is introduced into the room through the air supply duct 3 and the air supply port 1, and the room air is discharged to the outside of the room through the air discharge duct 4 and the air discharge port 2. In this instance, the room air and the outdoor air flowing through the air discharge duct 4 and the air supply duct 3 indirectly heat exchange at the preheat exchanger 6. Therefore, the outdoor air receives a portion of thermal energy from the room air discharged to the outside of the room, before introduction into the room, according to which loss of thermal energy caused in the ventilation can be reduced.

The air conditioning system of the present invention having the foregoing system can clean the outdoor air and supply to the room, forcibly. According to this, in comparison to the related art ventilation system in which the room air is discharged to the outside of the room by using only one fan, a ventilation efficiency can be improved, and a ventilation time period can be shortened.

The preheat exchanger makes the air supplied to the room to recover the thermal energy of the room air discharged to the outside of room in ventilation. According to this, rapid change of the room temperature in the ventilation can be prevented, and an energy saving effect can be obtained.

Figure 5:
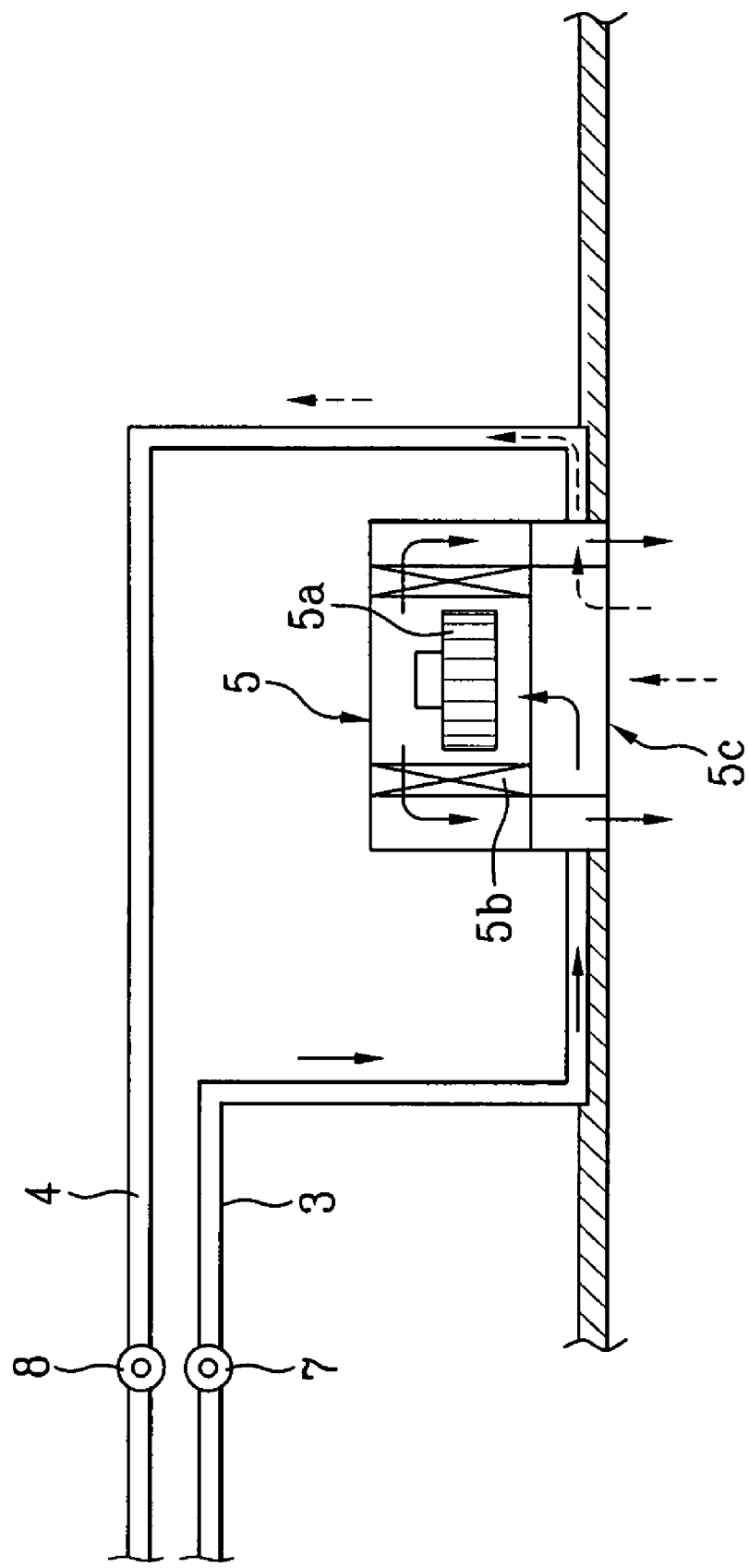
FIG. 5 illustrates a diagram of an air conditioner in accordance with another preferred embodiment of the present invention, schematically.

In the meantime, FIG. 5 illustrates a diagram of an air conditioner in accordance with another preferred embodiment of the present invention, schematically. Different from the embodiment described with reference to FIG. 1, the air conditioner in FIG. 5 has a structure in which the air supply duct 3 and the air discharge duct 4 connected to the indoor unit S, directly. In this embodiment, the indoor unit 5 is provided with a guide duct 5c under the indoor fan 5a and the indoor heat exchanger 5b. The guide duct 5c has the air supply duct 3 and the air discharge duct 4 connected thereto respectively, and the air supply duct 3 and the air discharge duct 4 have the air supply fan and the air discharge fan 8 mounted thereon, respectively. Though not shown, alike the embodiment described with reference to FIG. 1, the foregoing air conditioner may be provided with a preheat exchanger.

In the operation, upon putting the indoor unit 5 into operation, the indoor fan 5a rotates, to draw room air into the indoor unit 5 through the flow passage in a central part of the guide duct 5c. The room air drawn into the indoor unit 5 passes the indoor fan 5a and the indoor heat exchanger 5b, and is discharged to the room again through the flow passage in an outer part of the guide duct 5c. In this instance, the room air drawn into the indoor unit 5 is discharged into the room after the air heat exchanges at the indoor heat exchanger 5b. Therefore, the room is cooled or heated.

After the room is cooled, or heated for a preset time period, it is required to ventilate the room. In the ventilation, the air supply fan 7 and the air discharge fan 8 respectively mounted on the air supply duct 3 and the air discharge duct 4 are rotated. When the air supply fan 7 rotates, the air is introduced from the air supply duct 3 to the guide duct 5c. As shown in FIG. 5, after introduced into the guide duct 5c, the outdoor air passes the indoor fan 5a and the indoor heat exchanger 5b, and is discharged into the room through the guide duct 5c, again. As shown in dashed arrows in FIG. 5, when the air discharge fan 8 rotates, the room air is introduced into the guide duct 5c, and is discharged to the outside of the room through the air discharge duct 4 connected to the guide duct 5c.

During the ventilation, the indoor unit 5 may or may not be in operation. If the ventilation is carried out during the indoor unit is in operation, the outdoor air is supplied to the room after the outdoor air heat exchanges at the indoor heat exchanger 5b. According to this, the rapid temperature change that can take place in the ventilation can be prevented. On the other hand, the room can also be ventilated by only rotating the air supply fan 7 and the air discharge fan 8 in a state the indoor unit 5 is stationary.

In the meantime, if the preheat exchanger is further provided, the outdoor air heat exchanges with the room air discharged to the outside of the room at the first time, and heat exchanges at the indoor heat exchanger 5b at the next time, before being supplied to the room. According to this, waste of an energy, and the rapid temperature change in ventilation can be prevented, more effectively.

Despite of the foregoing advantages, the air conditioner of the present invention has things to be improved, which will be described as follows.

In the air conditioner, a flow rate of the outdoor air supplied to the room by the air supply fan 7, and the flow rate of the room air discharged to the outside of the room by the air discharge fan 8 are identical.

According to this, the outdoor air supplied to the room can not be supplied to every part of the room, adequately. This is because the outdoor air supplied to the room circulates along a flow path in the room, and is discharged to the outside of the room through the discharge duct 4. According to this, a ventilation efficiency becomes poor, and a long ventilation time period is required.

Moreover, the air conditioner has a problem of consumption of much energy because it is required that both the air supply fan 7 and the air discharge fan are rotated for a long time period at a fast speed.

The foregoing problems can be solved by changing and modifying a structure of the air conditioner described with reference to FIGS. 1 to 5. It cost much for the change of the structure of the air conditioner. Therefore, the present invention suggests a method for controlling a ventilation air rate appropriately in an air conditioner having a ventilation system with an air supply duct 3, an air discharge duct 4, an air supply fan 7, an air discharge fan 8, and the like. If the method for controlling a flow rate of ventilating air in accordance with the present invention is applied to the air conditioner described with reference to FIGS. 1 to 5, the foregoing problems can be solved without change of the structure of the air conditioner. The method for controlling a flow rate of ventilating air of the present invention will be described in detail, with reference to the attached drawings.

Before starting description of the method for controlling a flow rate of ventilating air of the present invention, a few words will be defined. The flow rate is an amount (volume) of air flowing in the air supply duct 3 or the air discharge duct 4 per a unit time period. For reference, as the unit of the flow rate, $m^3/min$, $m^3/Hr$, or $Nm^3/min$ can be used. The flow rate of the outdoor air flowing through the air supply duct 3 is called as a first flow rate, and the flow rate of the room air flowing through the air discharge duct 4 is called as a second flow rate.

The method for controlling a flow rate of ventilating air of the present invention includes the steps of supplying outdoor air drawn through the air supply duct 3 to a room at a first flow rate, and discharging room air drawn through the air discharge duct 4 to an outside of a room at a second flow rate. In this instance, the second flow rate is greater than the first flow rate.

In the method of the present invention, the steps of supplying outdoor air to a room, and discharging room air to an outside of a room may be started at the same time. However, the present invention is not limited to this, the supply step and the discharge step may be started with a time difference between the steps. For an example, during the time the discharge step is started at first to discharge the room air, the supply step may be started.

In the meantime, if it is assumed that the air conditioning system is designed such that sectional areas of the air supply duct 3 and the air discharge duct 4 are identical, and the air supply fan 7 and the air discharge fan 8 have the same flow rates at the same rotation speed, the first flow rate and the second flow rate are dependent on the rotation speeds of the air supply fan 7 and the air discharge fan 8. Therefore, if the rotation speed of the air supply fan 7 or the air discharge fan 8 is changed, the first flow rate or the second flow rate is changed as well.

Therefore, in this case, when it is intended to have the second flow rate greater than the first flow rate, it is required to run the air discharge fan 8 faster than the air supply fan 7. For an example, if the rotation speed of the air supply fan 7 is set to 1000 rpm, and the rotation speed of the air discharge fan 8 is set to 2000 rpm, the second flow rate becomes greater than the first flow rate. Meanwhile, if it is intended to change the first flow rate and the second flow rate individually, it is required to change the rotation speeds of the air discharge fan 8 and the air supply fan 7, individually.

Accordingly, the method for controlling a flow rate of ventilating air of the present invention may be described to include the steps of supplying the outdoor air to a room at a first flow rate by rotating the air supply fan at a first rpm, and discharging room air to an outside of the room at a second flow rate by rotating the air discharge fan at a second rpm. In this instance, second rpm is higher than the first rpm.

In the meantime, the air conditioning system may be designed such that the sectional areas of the air supply duct 3 and the air discharge duct 4 are different from each other, and the air supply fan 7 and the air discharge fan 8 have flow rates different from each other. In this case, a difference of the second flow rate and the first flow rate is not dependent only on the difference of the rotation speeds.

In this case, the difference of the second flow rate and the first flow rate is dependent on many factors, such as the sectional areas of the air supply duct 3 and the air discharge duct 4, structures and sizes of the air supply fan 7 and the air discharge fan 8, rotation speeds of the air supply fan 7 and the air discharge fan 8, and the like. Despite of this, since the method of the present invention suggests the second flow rate higher than the first flow rate, in the present invention, the second flow rate is designed to be higher than the first flow rate by taking all the factors into account. In this case too, if it is intended to change the first flow rate and the second flow rate, the rotation speeds of the air supply fan 7 and the air discharge fan 8 are changed. This is because there are no changes in structures and sizes of the air supply duct 3, the air discharge duct 4, and the air supply fan 7 and the air discharge fan 8.

If the flow rate of the room air discharged to the outside of the room through the air discharge duct 4, i.e., the second flow rate is greater than the flow rate of the outdoor air supplied to the room through the air supply duct 3, i.e., the first flow rate, there is a pressure difference between the room and the outdoor. According to this, the outdoor air can be introduced into the room through the air supply duct 3 easily, a load on the air supply fan 7 drops, to increase an air supply efficiency. In addition to this, the outdoor air can be introduced into the room having a relatively low pressure quickly, and spread to every part of the room. According to this, the room can be ventilated, quickly.

Figure 6A:
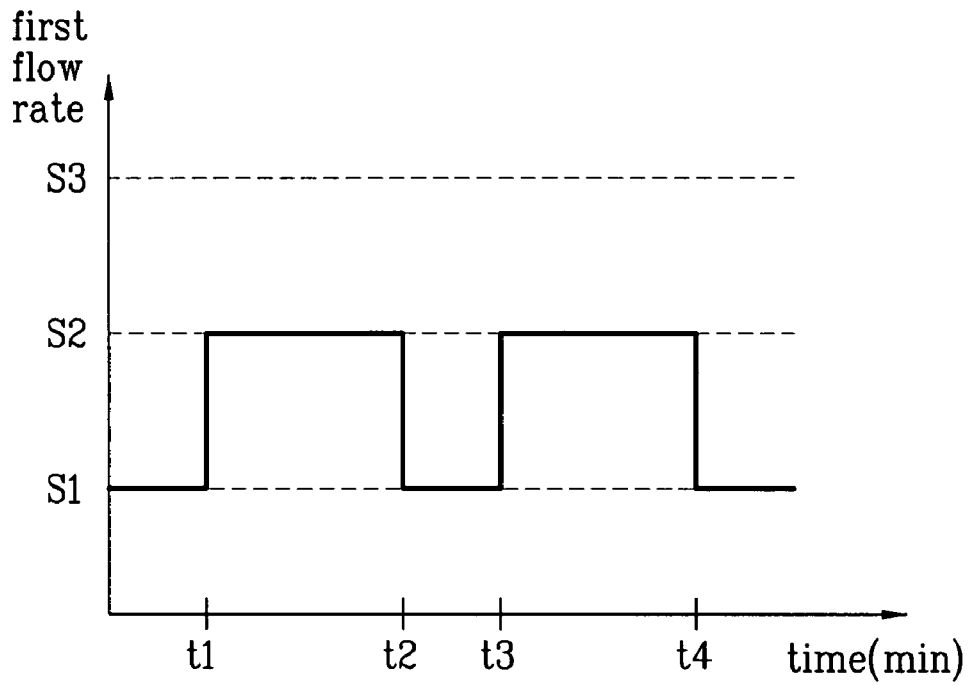
FIGS. 6A~6C illustrate graphs each showing time vs. flow rate in a method for controlling a flow rate of ventilating air in accordance with a first preferred embodiment of the present invention.

In the meantime, according to the method of the present invention, the first flow rate can be varied with time. An example in which the first flow rate is varied with time is illustrated in FIG. 6A. For reference, the horizontal axis in the FIG. 6A represents time, and the vertical axis represent a flow rate. The dashed lines in FIG. 6A represent first flow rates at 1000 rpm, 2000 rpm, and 3000 rpm of the air supply fan 7, respectively.

Referring to FIG. 6A, the air conditioner is operated such that the first flow rate at initial ventilation is 'S1' until a time t1, and the first flow rate is 'S2' from the time t1 to a time t2. Then, the air conditioner is operated such that the first flow rate is 'S1' again from the time t2 to a time t3, and 'S2' again from the time t3 to a time t4. For this, the air supply fan 7 is controlled to rotate at 1000 rpm, 2000 rpm, 1000 rpm, and 2000 rpm for the time periods, for an example, divided by the times of t1, t2, t3, and t4, respectively.

Referring to FIG. 6A, it can be noted that the first flow rate varies at regular intervals. In more detail, the first flow rate varies up to t2 as one cycle, and from t2 to t4 as another cycle.

Figure 6B:
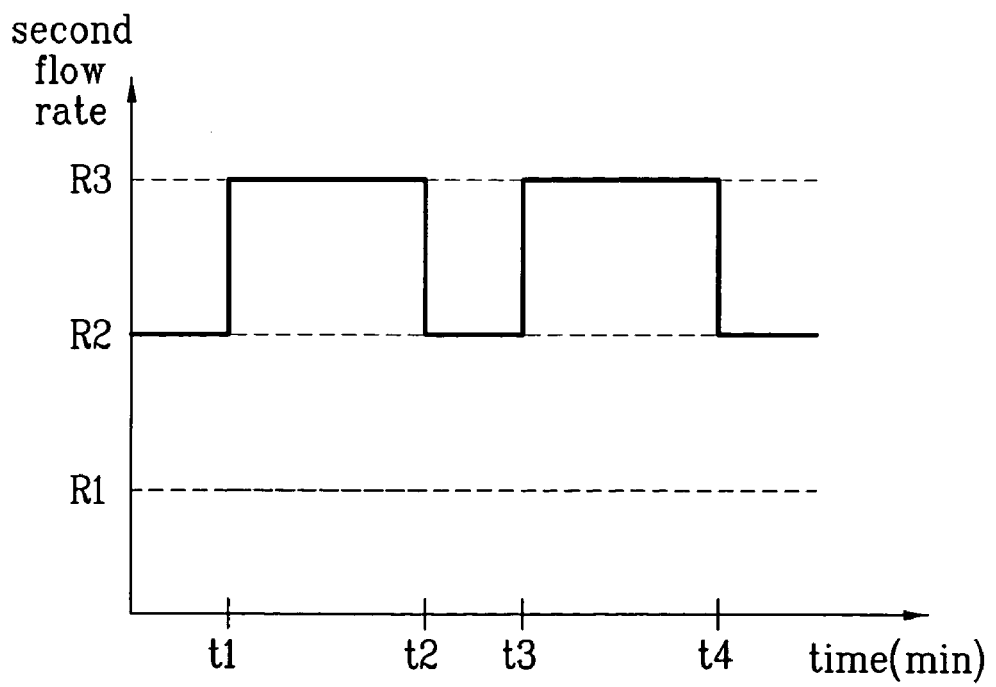

In the meantime, according to the method of the present invention, the second flow rate may also be varied with time. An example in which the second flow rate varies with time is illustrated in FIG. 6B. For reference, the dashed lines in FIG. 6B represent the second flow rates at 1000 rpm, 2000 rpm, and 3000 rpm of the air discharge fan 8.

Referring to FIG. 6B, the air conditioner is operated such that the second flow rate at initial ventilation is 'R2' until a time t1, and 'R3' from the time t1 to a time t2. Then, the air conditioner is operated such that the second flow rate is 'R2' again from the time t2 to a time t3, and 'R3' again from the time t3 to a time t4. For this, the air discharge fan 8 is controlled to rotate at 2000 rpm, 3000 rpm, 2000 rpm, and 3000 rpm for the time periods, for an example, divided by the times of t1, t2, t3, and t4, respectively.

Referring to FIG. 6B, it can be noted that the second flow rate varies at regular intervals. In more detail, the second flow rate varies up to t2 as one cycle, and from t2 to t4 as another cycle.

Figure 6C:
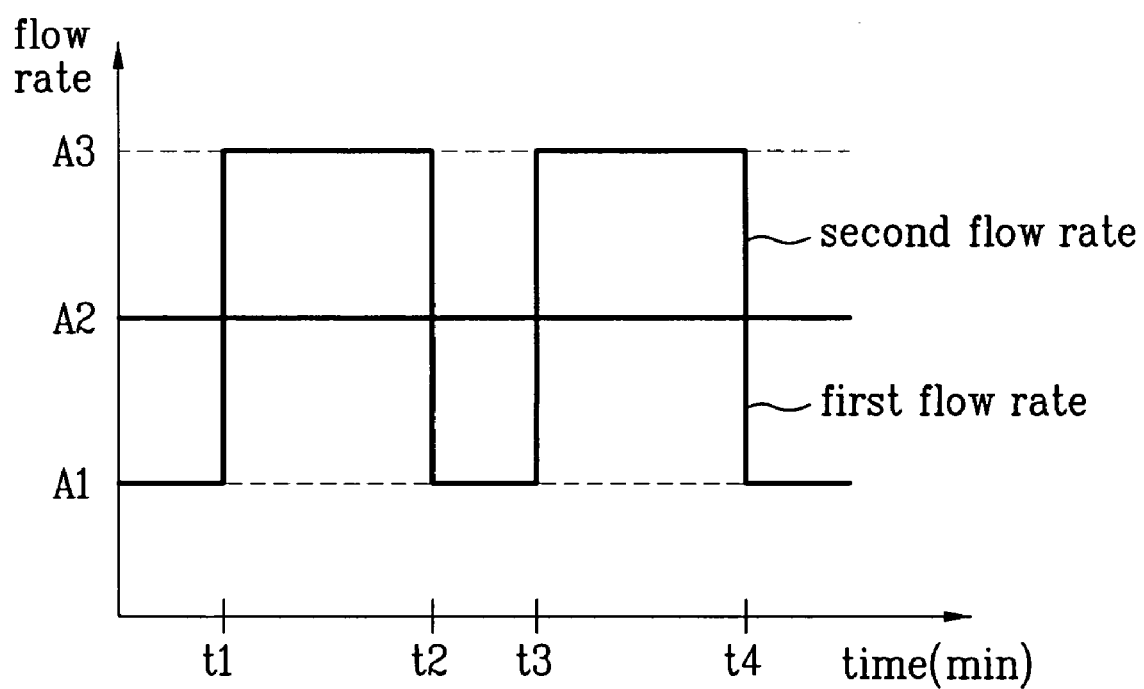

In the meantime, in the method for controlling a flow rate of ventilating air of the present invention, the air supply step and the air discharge step can be carried out simultaneously. Both the first flow rate and the second flow rate can be varied with time. Therefore, it is required to a relation of time versus the first flow rate and the second flow rate. FIG. 6C illustrates a graph derived from such a requirement.

The graph in FIG. 6C is obtained under the assumption that the sectional areas of the air supply duct 3 and the air discharge duct 4 are the same, and the air supply fan 7 and the air discharge fan 8 have the same flow rates at the same rotation speeds. The horizontal axis represents time, and the vertical axis represents a flow rate. Particularly, the plurality of dashed lines parallel to the horizontal axis represent flow rates at 1000 rpm, 2000 rpm, and 3000 rpm of the air supply fan 7 and the air discharge fan 8, respectively.

Referring to FIG. 6C, the first flow rate and the second flow rate vary with the same cycle. Variations of the first flow rate and the second flow rate up to the time t2, one cycle, will be discussed. The first flow rate is A1 until a time t1, and A2 from the time t1 to a time t2. For this, the air supply fan 7 runs at 1000 rpm until the time t1, and at 2000 rpm from the time t1 to the time t2. On the other hand, the second flow rate is A2 until a time t1, and A3 from the time t1 to a time t2. For this, the air discharge fan 8 runs at 2000 rpm until the time t1, and at 3000 rpm from the time t1 to the time t2.

As noted in above discussion, the first flow rate and the second flow rate vary in the same cycle. In this instance, a difference of the first flow rate and the second flow rate is the same, always. In other words, the rotation speeds of the air supply fan 7 and the air discharge fan 8 vary in the same cycle. In this instance, a difference of the rotation speeds of the air supply fan 7 and the air discharge fan 8 are the same, always.

When the ventilation is carried out by the foregoing method, there is a constant pressure difference between the room and the outdoor. According to this, the outdoor air can be introduced into the room easily during the ventilation, and the outdoor air introduced into the room can be supplied to every part of the room, easily. According to this, the ventilation efficiency is improved, and a time period for the ventilation is shortened. Moreover, a load on the air supply fan 7 that supplies the outdoor air to the room is reduced, to reduce an energy consumption.

In the meantime, there are a method for controlling a flow rate of ventilating air in accordance with another preferred embodiment of the present invention illustrated in FIGS. 7A~8C. Referring to the drawings, in the method of the present invention, it can be noted that the first flow rate and the second flow rate vary in cycles respectively, with many times of variations even in one cycle.

Figure 7A:
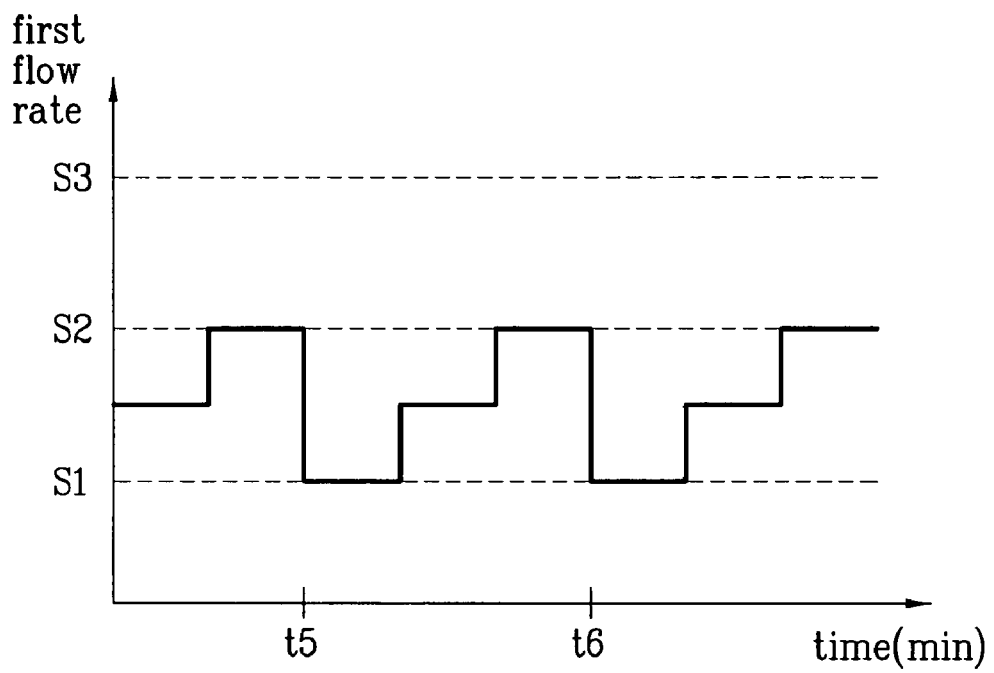
FIGS. 7A~7C illustrate graphs each showing time vs. flow rate in a method for controlling a flow rate of ventilating air in accordance with a second preferred embodiment of the present invention.
Figure 7B:
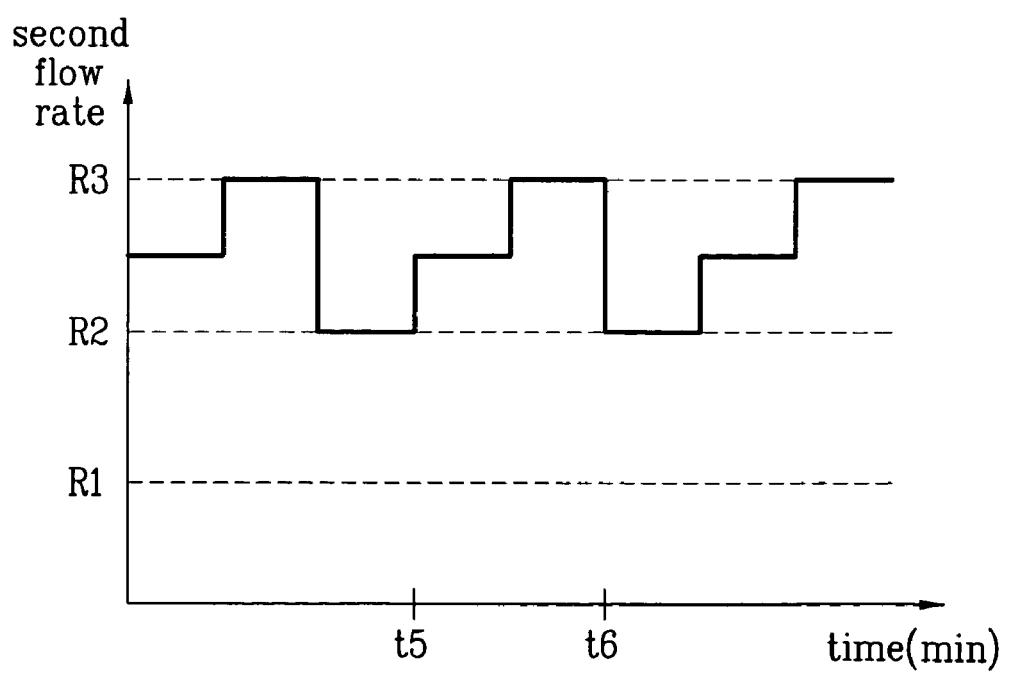
Figure 7C:
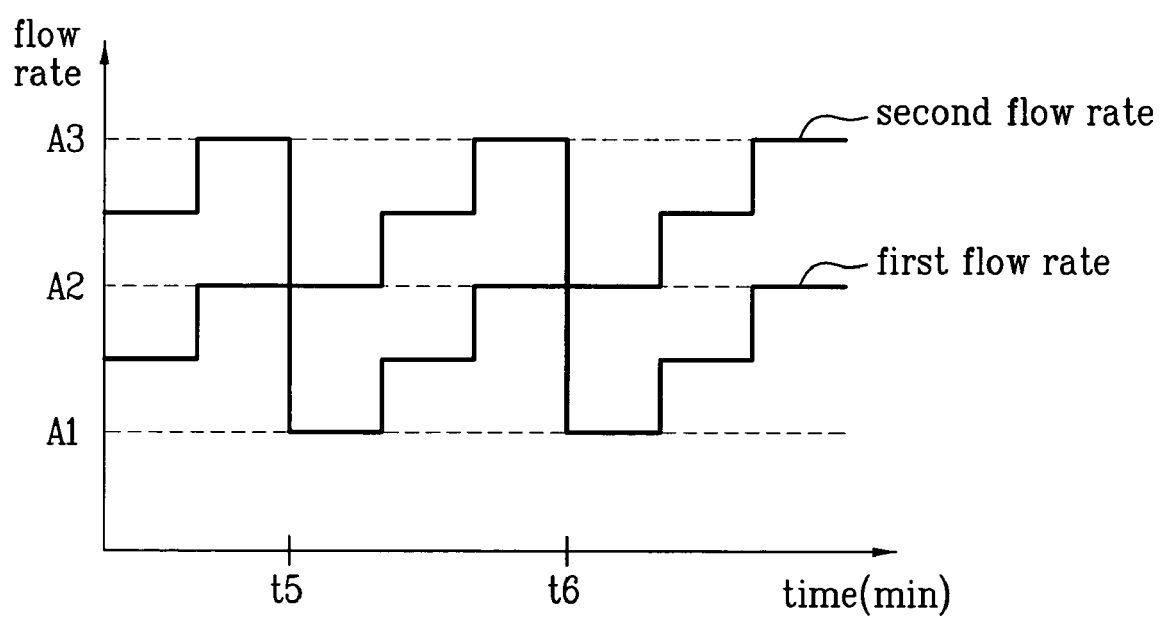

Referring to FIGS. 7A to 7C, the first flow rate and the second flow rate vary up to t5 as one cycle. Within a time period up to t5, the first flow rate varies to have a middle flow rate of 'S1' and 'S2' flow rates, the 'S2' flow rate, and the 'S1' flow rate in a sequence. The second flow rate varies to have a constant difference with the first flow rate, always.

Figure 8A:
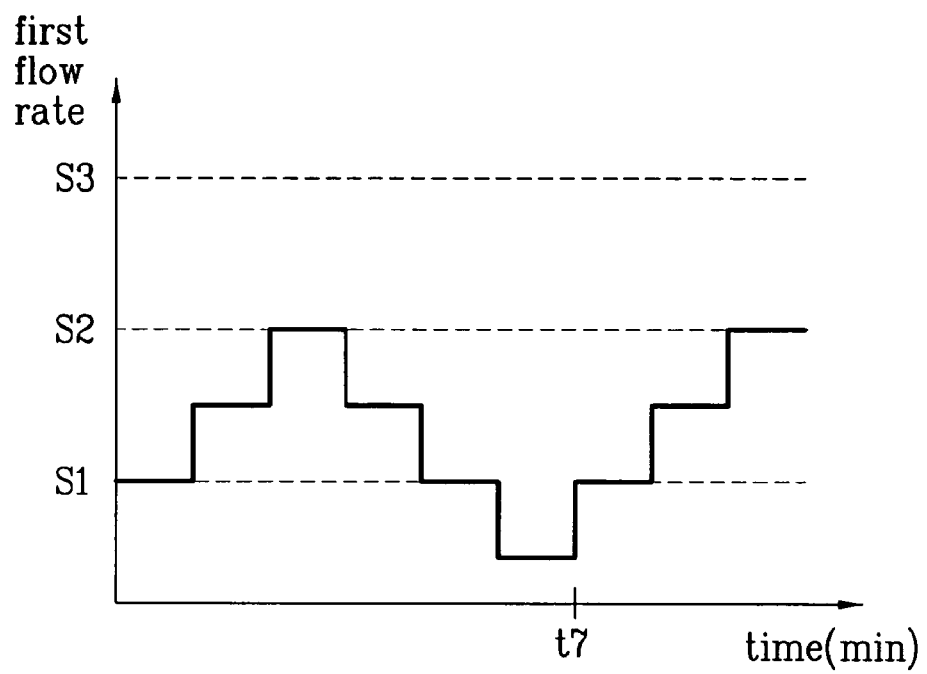
FIGS. 8A~8C illustrate graphs each showing time vs. flow rate in a method for controlling a flow rate of ventilating air in accordance with a first preferred embodiment of the present invention.
Figure 8B:
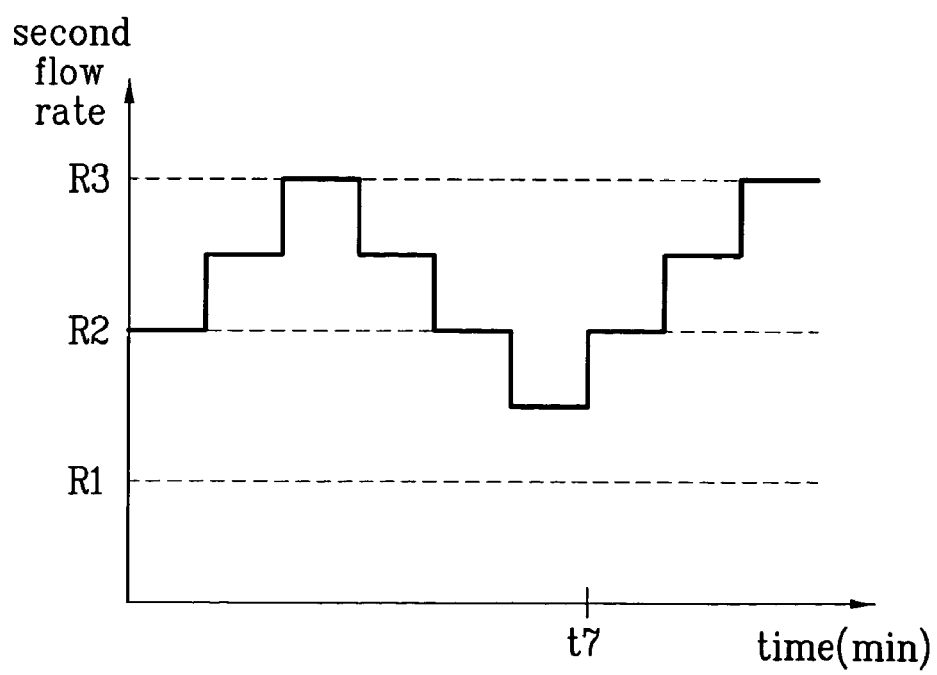
Figure 8C:
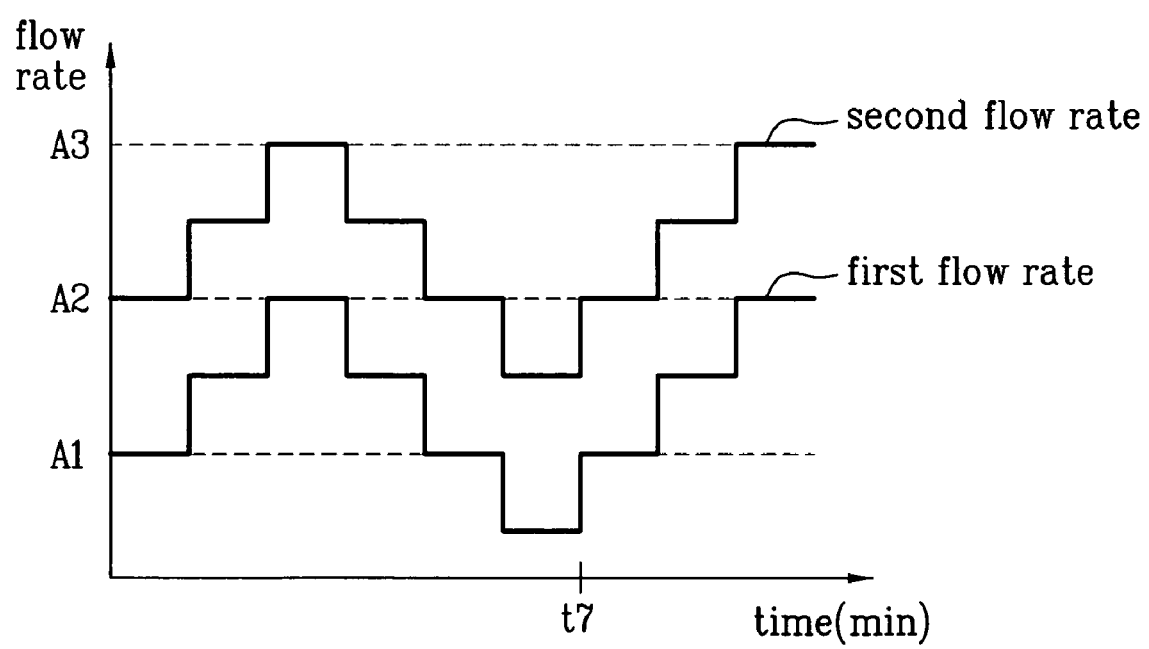

Referring to FIGS. 8A to 8C, the first flow rate and the second flow rate vary up to t7 as one cycle. Within a time period up to t7, the first flow rate varies to have an 'S1' flow rate, a flow rate between 'S1' and 'S2' flow rates, the 'S2' flow rate, the flow rate between 'S1' and 'S2' flow rates, and the 'S1' flow rate in a sequence. Of course, the second flow rate varies to have a constant difference with the first flow rate, always.

Meanwhile, the foregoing method of the present invention is applicable to the air conditioners having structures shown in FIGS. 1~5 actually, and of course, even to the air conditioner with a structure of FIG. 5 having the preheat exchanger in FIG. 1 further provided thereto, which will be described.

The method for controlling a flow rate of ventilating air of the present invention is applicable to the air conditioner having the preheat exchanger 6 illustrated in FIGS. 1~4. In this case, the method for controlling a flow rate of ventilating air of the present invention may further include the step of heat exchanging between the room air and the outdoor air flowing in the air supply duct 3 and the air discharge duct 4 respectively. Then, while the air supply step and the air discharge step described before are progressed, the heat exchange is made at the preheat exchanger 6 between the outdoor air supplied to the room through the air supply duct 3 and the room air discharged to the outside of the room through the air discharge duct 4. According to this, the rapid change of the room temperature in the ventilation can be prevented, because the outdoor air supplied to the room is supplied after supplied with the heat of the room air discharged to the outside of the room.

Meantime, in the method of the present invention, the second flow rate is higher than the first flow rate, which implies that an amount of the room air is larger than an amount of the outdoor air, both passing through the preheat exchanger 6 within the same time period. Therefore, the outdoor air supplied to the room can heat exchange with the large amount of the room air discharged to the outside of the room. According to this, a heat exchange efficiency at the preheat exchanger is enhanced, and the rapid temperature change of the room can be prevented, effectively.

Next, the method for controlling a flow rate of ventilating air of the present invention is applicable to the air conditioner having the air supply duct 3 and the air discharge duct 4 connected to the indoor unit 5 directly, described with reference to FIG. 5. In this case, the method for controlling a flow rate of ventilating air of the present invention may further include the step of heat exchanging the outdoor air passing through the air supply duct 3 with the indoor heat exchanger 5b of the air conditioner. Then, the outdoor air is introduced into the room after the outdoor air heat exchanges at the indoor heat exchanger 5b in the indoor unit 5. According to this, the air conditioner can ventilate the room while the air conditioner cools or heats the room, continuously. In this case too, the rapid temperature change of the room in the ventilation can be prevented.

In the meantime, the method of the present invention is applicable even to a case the air conditioner in FIG. 5 has the preheat exchanger 6 in FIGS. 1 to 4 in the same fashion. Then, the outdoor air supplied to the room through the air supply duct 3 heat exchanges with the room air discharged to the outside of the room through the air discharge duct 4 at the preheat exchanger 6, at first. Then, the outdoor air having the heat received from the room air in above process heat exchanges at the indoor heat exchanger 5b in the indoor unit 5 next, before being supplied to the room. According to this, not only the heat discharged to the outside of the room can be recovered, but also ventilation of the room can be carried out while the room is cooled or heated continuously.

In the meantime, the foregoing processes can be carried out after the step for the indoor unit 5 to draw and discharge the room air to cool or heat the room is carried out for a preset time period, and the step for the indoor unit 5 to stop operation is carried out. Then, the ventilation is carried out as the air discharge fan 8 and the air supply fan 7 rotate in a state the indoor unit 5 is stationary. The process and method of the ventilation, described in detail before, will be omitted.

Oppositely, the foregoing processes can be carried out in a state the indoor unit 5 is in operation. For an example, by operating the indoor unit 5, the air supply fan 7, and the air discharge fan 8 at the same time, the cooling or heating, and the ventilation can be carried out. If this method is applied to the air conditioner illustrated in FIGS. 1 to 4, the indoor unit 5 cools or heats the room continuously, and the outdoor air is supplied to the room after the outdoor air heat exchanges with the room air discharged to the outside of the room. If this method is applied to the air conditioner in FIG. 5 having the preheat exchanger 6 illustrated in FIGS. 1 to 4, the outdoor air is supplied to the room after the outdoor air heat exchanges for two times at the preheat exchanger 6 and the indoor heat exchanger 5b. Meanwhile, as another example, after the indoor unit 5 is operated for a preset time period, the air supply fan 7 and the air discharge fan 8 can be operated together with the indoor unit 5.

As has been described, the method of the present invention has the following advantages.

First, a flow rate of the room air discharged to an outside of a room is higher than the flow rate of the outdoor air supplied to the room. According to this, a pressure difference is occurred between the room and the outdoor, which permits an easy introduction of the outdoor air into the room. Moreover, the air introduced into the room can be supplied to every part of the room, quickly, thereby improving a ventilation efficiency and reducing a ventilation time period.

Second, the pressure difference occurred between the room and the outdoor during the ventilation reduces load on the air supply fan which supplies the outdoor air to the room, to save an energy consumption.

Third, in the ventilation, the heat exchange between the room air discharged to the outside of the room and the outdoor air supplied to the room at first permits to recover heat discharged to the outside of the room, to save an energy for cooling or heating.

Fourth, since the outdoor air supplied to the room takes the heat from the room air discharged to the outside of the room in ventilation, the rapid change of the room temperature in ventilation can be prevented. According to this, a comfortable room environment can be provided even in ventilation.

Fifth, in ventilation, the outdoor air supplied to the room heat exchanges at the indoor heat exchanger in the indoor unit before being supplied to the room. Therefore, the room can be ventilated at the same time with cooling or heating the room.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for controlling a flow rate of ventilating air in an air conditioner, comprising the steps of:
   cooling or heating a room by drawing and discharging room air using an indoor unit;
   stopping the indoor unit after a preset time period is passed;
   supplying outdoor air drawn through an air supply duct to the room at a first flow rate with the indoor unit off; and
   discharging room air drawn through an air discharge duct to outside of the room at a second flow rate higher than the first flow rate with the indoor unit off.

2. The method as claimed in claim 1, wherein the steps of supplying and discharging are carried out at the same time, and the first and second flow rates vary with time.

3. The method as claimed in claim 2, wherein the difference between the first and second flow rates is constant.

4. The method as claimed in claim 1, further comprising the step of heat exchanging between the outdoor air and the room air flowing in the air supply duct and the air discharge duct, respectively.

5. The method as claimed in claim 1, further comprising the step of heat exchanging the outdoor air passed through the air supply duct at the indoor heat exchanger in the air conditioner.

* * * * *